United States Patent [19]

Tricoles et al.

[11] Patent Number: 5,557,277
[45] Date of Patent: Sep. 17, 1996

[54] METHOD FOR LOCATING LEAKAGE OF SUBSTANCES FROM SUBTERRANEAN STRUCTURES

[75] Inventors: Gus P. Tricoles, San Diego, Calif.; Wayne K. Davis, Colorado Springs, Colo.; James T. Nilles, Escondido, Calif.

[73] Assignee: GDE Systems, Inc., San Diego, Calif.

[21] Appl. No.: 301,057

[22] Filed: Sep. 6, 1994

[51] Int. Cl.$^6$ ............................. G01S 13/88; G01S 13/89
[52] U.S. Cl. ............................................. 342/22; 324/326
[58] Field of Search ........................ 342/22, 27; 324/345, 324/326, 337; 73/40

[56] References Cited

U.S. PATENT DOCUMENTS

| | | | |
|---|---|---|---|
| 4,706,031 | 11/1987 | Michiguchi et al. | 342/22 |
| 5,327,139 | 7/1994 | Johnson | 342/22 |
| 5,410,252 | 4/1995 | Potter et al. | 324/345 |

Primary Examiner—Ian J. Lobo
Attorney, Agent, or Firm—Brown, Martin, Haller & McClain

[57] ABSTRACT

A method for imaging substances leaking from underground structures using continuous-wave signals includes translating an antenna array over the ground, transmitting a continuous-wave signal into the ground at an array of points, detecting the amplitude and phase of the reflected signal at each point, transforming the reflectance values into the frequency domain, propagating this reflectance spectrum to a predetermined depth, and transforming the propagated spectrum into an image in the spatial domain at that depth. An image representing the underground structure containing the substance may be overlayed on the calculated image to detect differences that represent leakage. Successive images of the same area may be produced over a period of time and the differences compared to determine the rate of leakage.

12 Claims, 3 Drawing Sheets

METHOD FOR LOCATING LEAKAGE OF SUBSTANCES FROM SUBTERRANEAN STRUCTURES

BACKGROUND OF THE INVENTION

The present invention relates generally to electromagnetic imaging and, more specifically, to a system for imaging subterranean leakage from pipes, storage tanks and the like using continuous-wave (CW) signals.

Electromagnetic imaging systems have been used to locate subterranean objects such as land mines, buried pipes, tanks, and archaeological structures. In conventional electromagnetic imaging systems, an antenna is translated over the ground surface, and data are collected at multiple discrete points along the path that the antenna traverses. At each point, a broadband radar produces a series of short duration pulses that contain a range of frequencies. The system achieves resolution in the depth dimension by measuring the travel time of the pulses. Object structure in the horizontal dimensions is obtained from variations in the magnitude of the reflection from the buried object. The system could Fourier transform to the collected data to produce a holographic or three-dimensional image of the object provided phase data were measured; however, conventional pulsed systems do not measure phase, so images are not formed.

Pulsed radar systems are useful for detecting large underground objects such as land mines and archaeological structures. Although the presence and depth of such objects is relatively unpredictable, pulsed systems can image a sufficiently large volume of earth that any objects within it are likely to be detected. However, the image quality of pulsed systems suffers because the broadband pulses are degraded by the dispersion effects of the soil. Furthermore, images are affected if the levels of moisture or impurities in the soil vary over the area imaged because these levels affect pulse attenuation.

In Yue et al., *Two Reconstruction Methods for Microwave Imaging of Buried Objects,* IEEE Transactions on Computers, vol. c-24, No. 4, pp. 381-390, April 1975, a co-inventor of the present invention discloses a CW subterranean imaging system. The system has an antenna that is translated over the ground by a motor-driven carriage to project a single-frequency wave downward into the ground for a short duration at each point along the path that the antenna traverses. The system measures the amplitude and phase of the reflected wave at each point. A computer executes a Fourier transform that transforms this reflectance data to the spatial frequency domain.

In the above-described system, gathering a sufficient amount of data to form an image is extremely slow because a single antenna is mechanically translated over the ground surface in two dimensions. A manuscript, Davis et al., *Nearfield Imaging of Dielectric Anomalies: Antennas and Processing,* presented by the co-inventors of the present invention at a conference of the International Commission for Optics at Garmisch, Germany in April, 1990, disclosed an antenna array comprising two rows of identical antenna elements. The elements of the leading row are staggered with respect to those of the trailing row. After the leading row gathers reflectance data for the point over which each element is located, the array is advanced, and the trailing row gathers reflectance data for the points between the points for which the leading row previously gathered data. Thus, the antenna array effectively doubles the number of points in the dimension perpendicular to the direction of travel of the array. Increased sampling reduces errors in subsequent data processing.

Underground pipes and storage tanks are commonly used to transport or store many types of substances, including hazardous waste, petroleum products, natural gas, sewage, and water. Structural defects, corrosion, and seismic activity can rupture underground structures, causing the contents to leak into the earth. Leakage of some of these substances can be extremely injurious to the environment, polluting groundwater and endangering living organisms. The monetary cost for cleansing the earth of such substances can be astronomical, and damage to living organisms can often never be undone. Moreover, leakage of even the most benign substances wastes the valuable resources of both the substance itself and the manpower and materials expended in finding and repairing the leak. Conventional methods for locating such leakage are time-consuming and uneconomical. Every minute that a leak continues undetected compounds the damage and cost.

A fast, economical, and convenient method for locating leakage of underground structures is needed. These problems and deficiencies are clearly felt in the art and are solved by the present invention in the manner described below.

SUMMARY OF THE INVENTION

The present invention comprises a method for imaging substances leaking from underground structures. A coherent oscillator produces a continuous-wave (CW) signal at a number of predetermined frequencies. As an antenna array is translated over the ground, it transmits waves into the ground at a plurality of points, the waves are reflected by dielectric anomalies back up to the antenna array. A receiver detects the amplitude and phase of the reflected signal at each point. In accordance with an algorithm, a processor transforms the reflectance values into the spatial frequency domain, propagates this reflectance spectrum to a predetermined depth, and transforms the propagated spectrum back to the spatial domain to form an image at that depth. An operator may compare this calculated image with a predetermined image of a container to detect differences.

In an exemplary embodiment the calculated image represents a plan view of a dielectric anomaly such as the boundary between a body of fluid or soil saturated with a fluid and relatively dry soil. The predetermined image represents a plan view or cross-sectional view of a subterranean body of fluid, which may have leaked from a structure such as a pipe or tank. The two images may be overlayed on one another using a suitable display, which may be a cathode ray tube (CRT), pen plotter, or other visual output device. An operator can visually locate the differences, which represent areas in which the fluid has escaped from the structure.

The processor may repeatedly perform the above-described calculations, each using the same reflectance spectrum data but using different predetermined depths. The calculated image that has a portion correlating best with the predetermined image is selected for display, and an operator may interpret any portions of the calculated image that do not match any features of the profile image as leakage. Although the processor may perform any number of such calculations, the number need not be great because the range of depths at which leaks may occur is presumed to be known with substantial confidence. This knowledge is derived from knowledge of the location, depth and shape of the structure. Thus, the present invention can form images in real-time as the antenna array is translated over the terrain because the number of repeated calculations may be minimized.

The ability to generate images in real-time permits the method of the present invention to determine leakage rates. Multiple imaging sequences can be performed to observe changes in the leakage pattern with time. This capability would particularly be useful where multiple leaks have occurred over a pipeline as might be the case in an earthquake, and the most serious leaks, e.g., those having the highest leakage rates, need to be addressed first by a limited work crew. Also, the ability to measure leakage rates enable the determination of the rate of deterioration of the underground pipe or tank.

In addition to performing repeated calculations at several different depths, the processor may perform repeated calculations at several different frequencies. The frequency that produces the optimal image of the leakage depends on characteristics of the soil such as moisture content. As described above, the image formed as a result of each calculation can be correlated with the profile image, and the image that correlates best can be selected for display. Repeated calculations that vary the frequency can be performed in conjunction with repeated calculations that vary the propagation depth; multiple frequency calculations may be performed for depth or multiple depth calculations may be performed for each frequency.

The processor software may not only control the sequence of these calculations and the selection of the optimal image for display, but it may also allow the operator to manually control the viewing of all calculated images. Furthermore, it should be recognized that by using suitable algorithms, the processor may allow the operator to rotate, translate, filter or perform any other well-known image processing operations on these images.

Regardless of whether one image or several are calculated, the effects of dispersion are avoided in every image because the present invention uses a wave comprising a single frequency rather than broadband pulses. Furthermore, the effects of signal attenuation, which increases for increasing soil moisture, can be minimized because the present invention can select a wave having the lowest frequency that produces a good calculated image, i.e., an image having a portion that correlates well with the profile image.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF THE PREFERRED EMBODIMENT

Figure 1:
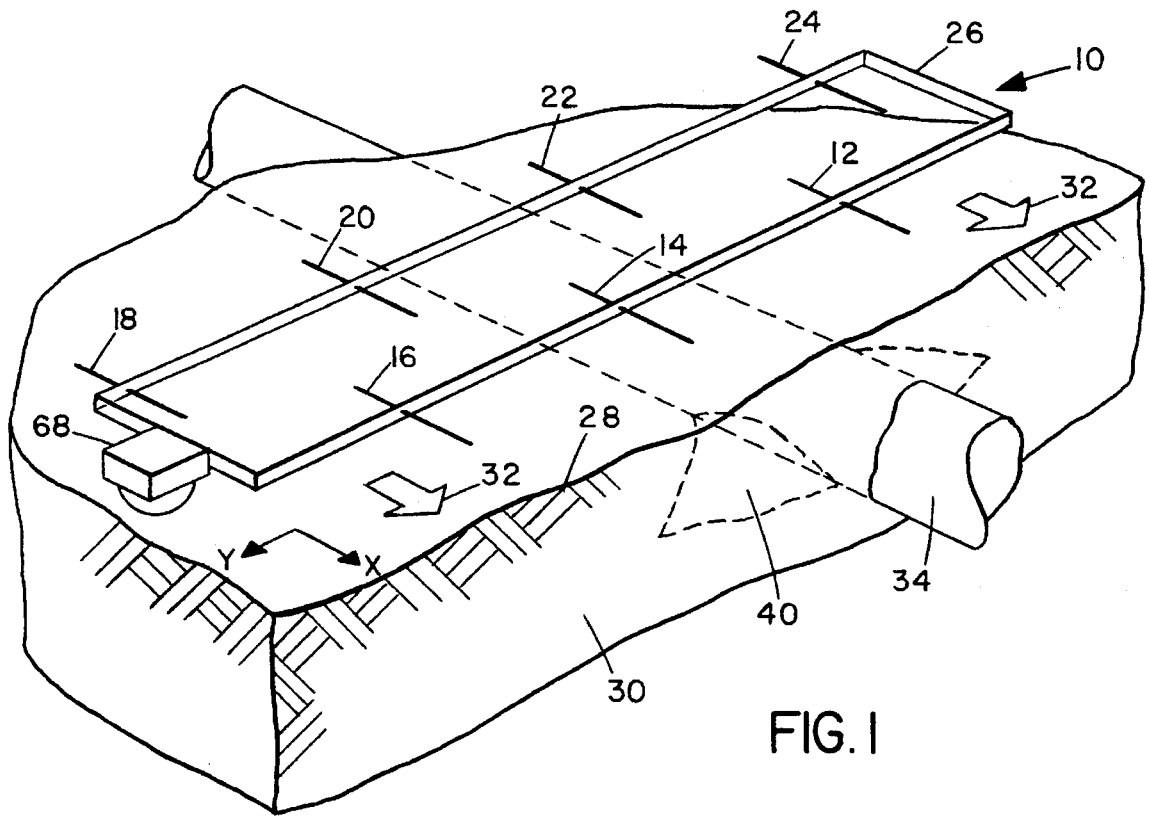
FIG. 1 illustrates an antenna array translated over an area of ground containing an underground pipe leaking a fluid.

As illustrated in FIG. 1, an antenna array 10 comprises antennas 12, 14, 16, 18, 20, 22 and 24. Antennas 12–24 may be any type of broadband or narrowband antenna, but antennas having two orthogonal polarizations are preferred. For example, antennas 12–24 may be dipotes or logarithmic spirals. Array 10 has a leading row along which antennas 12, 14, and 16 are disposed and a trailing row along which antennas 18, 20, 22 and 24 are disposed. The spacing between antennas is uniform in each row and the same for both rows. The rows are staggered to offset the antennas of the leading row from those of the trailing row by a distance equal to one-half the spacing between the antennas. A support 26 retains antennas 12–24 in this orientation. Support 26 may be any type of framework or housing that does not interfere with the operation of antennas 12–24 and is not important to the present invention.

Antenna array 10 is suspended above the surface 28 of an area of the ground 30 and translated over the area in the direction shown by arrows 32 using any suitable carriage means (not shown). For example, array 10 may be mounted on a vehicle (not shown) that moves over surface 28. Array 10 may also be mounted on a carriage (not shown) that moves along a track (not shown) placed in a fixed position on surface 28. In any embodiment, array 10 is preferably suspended close to surface 28. Experiments show optimum heights are approximately 0.05 to 0.25 wavelength.

Figure 4:
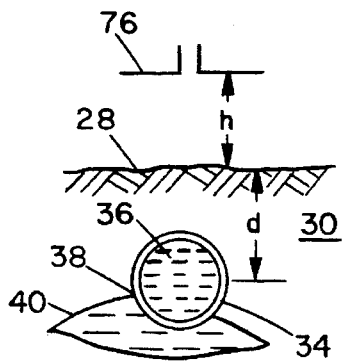
FIG. 4 is a sectional view of an area of ground containing an underground pipe leaking a fluid.

A pipeline 34 is buried in ground 30 and, as best shown in FIG. 4, contains a fluid 36. As used herein, the term "fluid" refers to any substantially fluid dielectric substance, including petroleum products, sewage and water. Pipeline 34 has a damaged area 38 that causes it to leak fluid 36 into the surrounding area of ground 30. This leakage region 40 becomes permeated with fluid 36.

Figure 2:
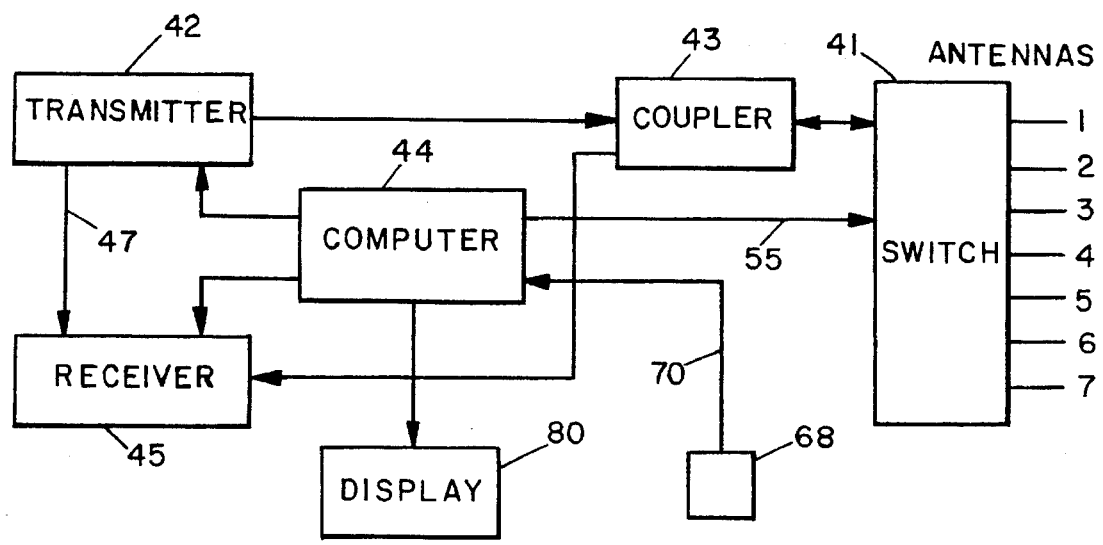
FIG. 2 is a schematic block diagram of a circuit for forming an image of representative of a pattern of underground fluid with dipole antennas.
Figure 3:
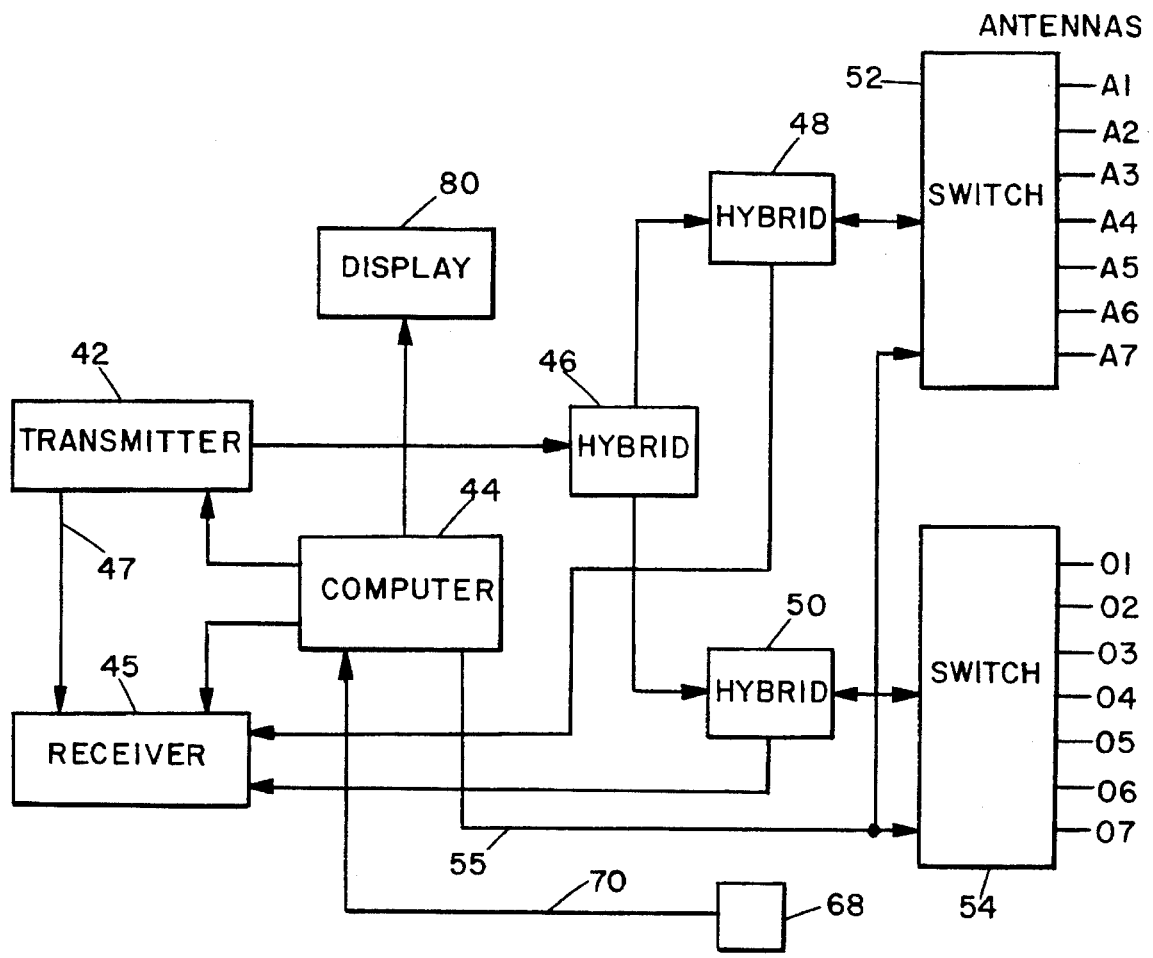
FIG. 3 is a diagram similar to FIG. 2, but the antennas have two polarizations.
Figure 5:
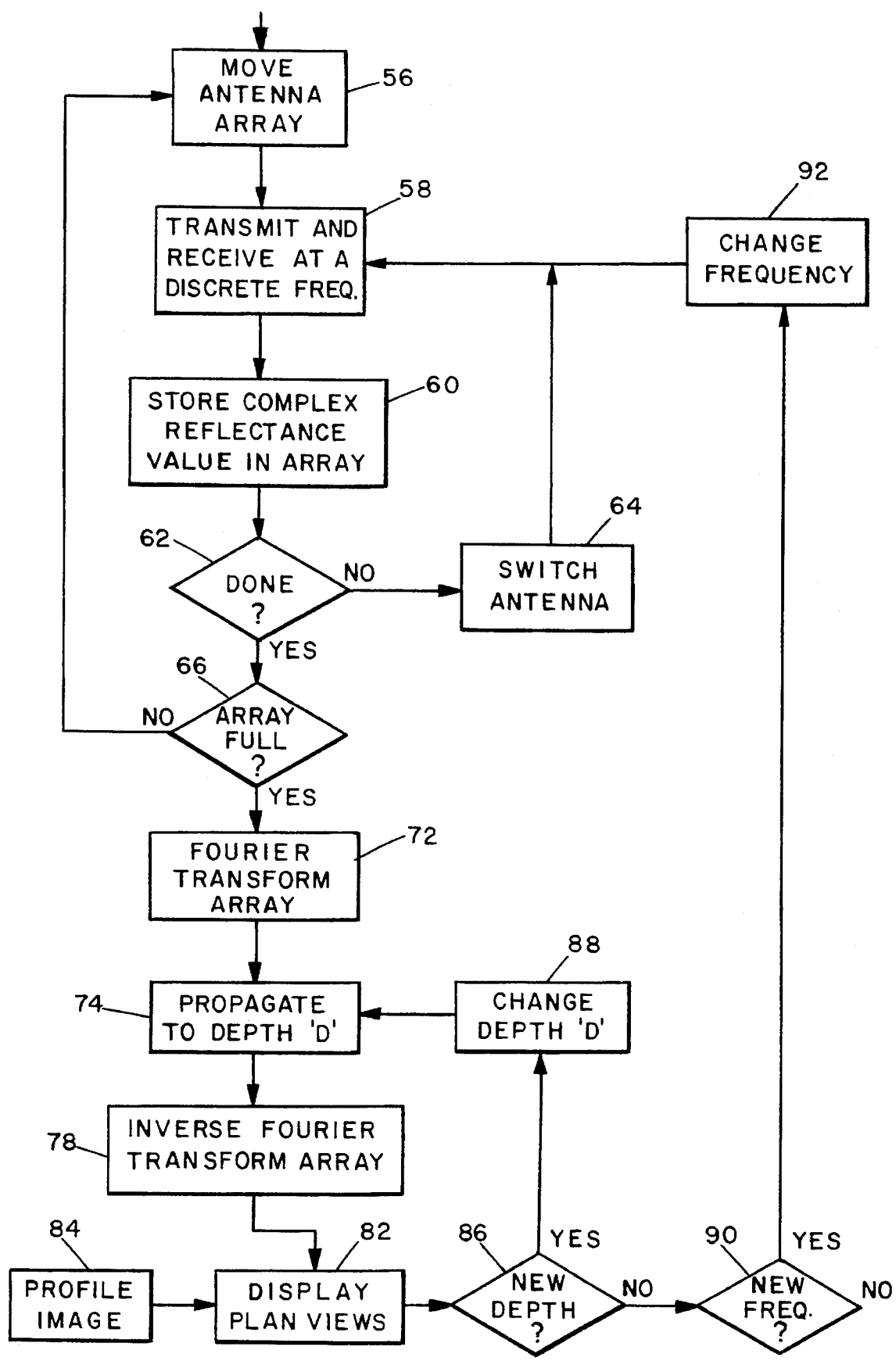
FIG. 5 is a flow diagram of a method for forming an image representative of a pattern of underground fluid.

Fluid 36, both in pipeline 34 and in leakage region 40, can be imaged using the electronic apparatus illustrated in FIGS. 2 or 3 in combination with the novel method illustrated in FIG. 5. Each of the dipole antennas 12–24 in FIG. 2 is connected through a computer controlled switch 41 to the transmitter 42 and by a directional coupler 43 to the receiver 45. Antenna 12 has feed 1; antenna 14 has feed 2; antenna 16 has feed 3; antenna 18 has feed 4; antenna 20 has feed 5; antenna 22 has feed 6; and antenna 24 has feed 7. FIG. 3 shows an arrangement that provides measurements for two, orthogonally polarized waves; each antenna 12–24 then has two orthogonally polarized feeds. One polarization is aligned (A) with travel directionl the other is orthogonal (O). Antenna 12 has feeds A1 and O1; antenna 14 has feeds A2 and O2; antenna 16 has feeds A3 and O3; antenna 18 has feeds A4 and O4; antenna 20 has feeds A5 and O5; antenna 22 has feeds A6 and O6; and antenna 24 has feeds A7 and O7.

The transmitter 42, controlled by a computer 44, generates a continuous-wave (CW) signal at a discrete frequency in a range of between approximately 0.1 gigahertz (GHz) and 1 GHz. Frequency selection is discussed in further detail, below. As shown in FIG. 2, for dipole antennas, each with a single feed 1–7, switch 41 directly and sequentially connects transmitter 42 to antennas 12–24. The reflected wave is connected to receiver 45 through directional coupler 43. As shown in FIG. 3, for dual-polarized antennas the transmitted wave is provided to a hybrid junction 46, which, in turn, provides its output to two other hybrids 48 and 50. This arrangement generates two temporally orthogonal signals, one of which can be provided to each A feed and the other to each spatially orthogonal O feed of antennas 12–24 via switches 52 and 54. Switch 52 receives the aligned (A) signal, and switch 54 receives the orthogonal (O) signal. Each antenna thus transmits a circularly polarized signal and receives two orthogonally polarized signals.

Beginning at step 56, array 10 is positioned above an area of surface 28 beneath which a container, such as pipeline 34, is known to be buried. At step 58, computer 44 generates a switching signal 55 that connects the A signal to one of feeds A1–A7 and simultaneously connects the O signal to the corresponding one of feeds A1–A7. The two feeds are connected to the A and O signals for a short period of time, preferably less than one millisecond (ms). During that period, computer 44 commands transmitter 46 to radiate a signal toward surface 28. The signal is reflected differently by fluid 36 and ground 30 because their dielectric properties are different.

Immediately following the period of time during which transmitter 46 is transmitting, computer 46 commands receiver 45 to measure the reflectance of signals reflected by ground 30 and fluid 36 for approximately the same length of time. Receiver 45 is coherent because it receives a reference signal 47 from transmitter 46. Receiver 45 measures both phase and amplitude of the reflected signal. At step 60, computer 44 stores the measured complex-valued reflectances in an array in its memory (not shown). Two dimensions of the array represent spatial coordinates in an x-y plane parallel to surface 28, and the third dimension is used to store the real and imaginary portions of the complex-valued reflectance at each spatial point.

At step 62, computer 44 determines whether a reflectance value has been measured for each of antennas 12–24. If not, for example with dual polarized antennas, then computer 44 uses switching signal 55 to connect the A signal to a different one of feeds A1–A7 and the O signal to the corresponding one of feeds O1–O7 at step 64. Steps 58–64 are repeated until reflectance values for all seven antennas 12–24 have been measured and stored in the array. The order in which the antennas connections are switched is unimportant.

Computer 44 forms an image when an array of a number of reflectance values suitable for performing a Fourier transform have been stored. An array having 8 by 8 or up to 64 by 64 reflectance values is preferred. The array coordinates correspond to the spacing between antennas. To build the array, computer 44 stores the reflectance values corresponding to antennas 12, 14 and 16 in three memory locations in the array having the same "x" coordinate but having "y" coordinates that differ by two. If, at step 66, the array is not yet full, computer 44 moves array 10 in the "x" direction, which is the same as the direction of arrows 32, a distance equal to the spacing between the leading and trailing rows. Antennas 18–24 are thus positioned at points having the same "x" coordinate as the points previously occupied by antennas 12–16 but having "y" coordinates that differ by two. Antennas 12–16 are thus positioned at points having "x" coordinates that are one greater than those of the points antennas 12–16 previously occupied before array 10 was moved.

Computer 44 then performs steps 58–64 and stores the reflectance values corresponding to antennas 18–24 in the empty memory locations adjacent to those in which the reflectance values corresponding to antennas 12–16 were stored before array 10 was moved. The reflectance values corresponding to antennas 12–16 are stored in memory locations having "x" coordinates one greater than those in which reflectance values corresponding to those antennas were stored before array 10 was moved. In this manner, the present invention stores successive rows of seven reflectance values, measured on a line orthogonal to the direction of travel.

After traversing a distance in the "x" direction equal to the length of the area of surface 28 that is to be imaged, antenna array 10 can be moved laterally, i.e., in the "y" direction, to gather additional data points. Alternatively, a larger number of antennas cam be used in each of the rows.

A position sensor 68 senses the position of array 10 in at least the "x" dimension but preferably also the "y" dimension. Position sensor 68 provides position information 70 to computer 44 and may be a trackball or similar two-axis device.

When the array is full, computer 44 performs a Fourier transform on it at step 72:

$$R(f,g;h) = \sum_{k,l} [R_m(x,y) - R_0(y)] e^{-i2\pi(fx_k+gy_l)} \qquad (1)$$

In equation 1, h is the height between surface 28 and an antenna 76, which represents any of antennas 12–24, as shown in FIG. 3. The resulting spectrum is represented by R. The reflectance values are represented by $R_m$. The constant $R_0$ represents the reflectance of an area of ground that contains no subterranean fluid 36. This constant may be determined using the apparatus shown in FIGS. 2 or 3.

At step 74, computer 44 mathematically propagates the resulting spectrum a distance of h through the air from antenna 76 to surface 28 and a distance of d through ground 30 from surface 28 to fluid 36:

$$R(f,g;-d) = \exp(-i2\pi h \sqrt{\lambda_1^{-2} - f^2 - g^2} \qquad (2)$$

$$\exp(-i2\pi h \sqrt{\lambda_2^{-2} - f^2 - g^2} \quad R(f,g;h). \qquad (3)$$

In equation 2, $\lambda_1$ is the wavelength of the signals in air, and $\lambda_2$ is the wavelength of the signals in ground 30.

At step 78, computer 44 performs an inverse Fourier transform to form an image at depth d:

$$I(x,y) = \sum_{m,n} R(f_m,g_n;-d) e^{-i2\pi(xf_m+yg_n)} \qquad (4)$$

Figure 6:
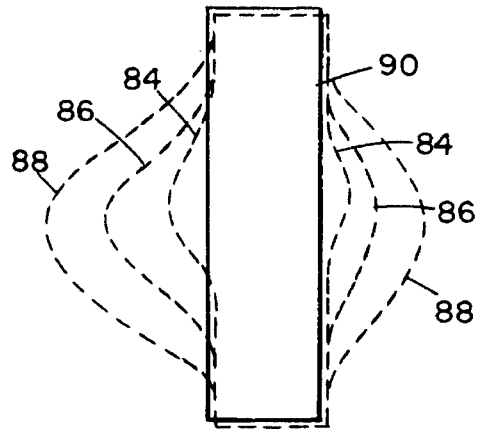
FIG. 6 is a plan view of several images, each of which is a plan view of a pattern of underground fluid.

Computer 44 may display the calculated image, I, on a cathode ray tube (CRT) display 80 at step 82. The calculated image represents a plan view of discontinuities in fluid 36 at depth d and may be similar to images 84, 86, and 88 in FIG. 6. Images 84, 86, and 88 may represent leakage region 40 at various points in time as fluid 36 leaks from pipeline 34 and spreads outward from pipeline 34 into the surrounding ground 30. Each image of an area may be stored for comparison to images of the same area formed at a later time to gauge the extent and rate of the leakage. As indicated in FIG. 6, these images may be displayed simultaneously to show the progression of the leak over time.

At step 84, computer 44 may simultaneously overlay a profile image 90 on the calculated image. Profile image 90 is a plan view of the outline of the body of fluid 36 contained in a section of pipeline 34 at a predetermined depth d. An operator can manipulate the calculated image or the profile image on the display to align them. The portion of the images that do not overlap may represent leakage region 40.

Since the location and depth of pipeline 34 are assumed known with substantial accuracy, an operator can select a depth d for use in the above-described calculations. However, at step 86, an operator may choose to calculate an additional image at a different depth d provided by the operator. At step 88, computer 44 changes the value of d and repeats steps 74, 78 and 82. Alternatively, computer 44 may be instructed to automatically generate a series of images at different depths ranging around an initial depth estimate that an operator provides. An operator can thus select the best calculated image, i.e., the image most similar to the profile image.

The present invention may also form images of the same area at different frequencies to select the frequency that produces an image exhibiting minimal effects of dispersion. The shape of the body of fluid 36 will affect the image because reflections from portions of fluid 36 will cancel reflections from other portions at certain frequencies. By forming images at several different frequencies, an operator can select the best image, i.e., the image most similar to the profile image. At step 90, an operator may enter a new frequency, and computer 44 changes this frequency at step 92. Reflectance values are then gathered as array 10 is again translated over surface 28, and new images are calculated, as discussed above. Alternatively, computer 44 may be instructed to successively gather reflectance values in response to several different frequencies at each point at which data is gathered. Computer 44 thus stores several arrays of data, each corresponding to reflectance values at a different frequency, but array 10 traverses the area to be imaged only once.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A method for producing an image representative of a pattern of leakage of a fluid from a structure buried in the ground, comprising the steps of:

translating an antenna array over an area of said ground having said structure buried therein;

transmitting and receiving a signal having a discrete frequency selected from a predetermined range of frequencies at each of a plurality of points in said area;

storing complex reflectance values having phase and intensity components in a computer memory, each said reflectance value representative of said signal received at one of said points;

Fourier transforming said stored complex reflectance values to form a received spatial spectrum;

propagating said received spatial spectrum to a predetermined depth;

inverse Fourier transforming the propagated spectrum to form a calculated image representative of said pattern of leakage of said fluid; and displaying said calculated image.

2. The method for producing an image described in claim 1, further comprising the step of overlaying on said calculated image a predetermined image representative of a pattern of said fluid in said structure.

3. The method for producing an image described in claim 2, wherein said calculated image and said predetermined image are plan views.

4. The method for producing an image described in claim 1, further comprising repeating said transmitting and receiving step, said propagating step, and said inverse Fourier transforming step a plurality of times to form a plurality of calculated images, each at a different discrete frequency selected from said predetermined range of frequencies.

5. The method for producing an image described in claim 1, further comprising repeating said propagating and inverse Fourier transforming steps a plurality of times to form a plurality of calculated images, each at a different depth.

6. The method for producing an image described in claim 1, further comprising the steps of:

repeating said transmitting and receiving step, said propagating step, and said inverse Fourier transforming step a plurality of times to form a plurality of calculated images each at a different discrete frequency selected from said predetermined range of frequencies; and repeating said propagating and inverse Fourier transforming steps a plurality of times to form a plurality of calculated images each at a different depth.

7. The method for producing an image described in claim 1, wherein said transmitting and receiving step comprises transmitting a circularly polarized signal and receiving two orthogonally polarized signals.

8. The method for producing an image described in claim 1, wherein:

said antenna array comprises a plurality of antenna elements disposed along an axis;

said translating step comprises the step of moving said antenna elements over corresponding linear paths in a predetermined direction; and said points lie on said corresponding linear paths.

9. The method for producing an image described in claim 8, wherein said antenna array comprises two parallel rows of antenna elements, each said row having said plurality of antenna elements distributed at a uniform spacing, each said antenna element of one row axially offset from at least one said antenna element of the other row by a distance equal to one-half said spacing.

10. The method for producing an image described in claim 9, wherein each said antenna is a dipole.

11. A method for determining a leakage rate, comprising the steps of:

forming successive calculated images at successive times during a predetermined period in response to continuous-wave signals directed toward the ground, each said calculated image representative of a pattern of leakage of a fluid from a structure buried in the ground, said forming step comprising the steps of:

translating an antenna array over an area of said ground having said structure buried therein;

transmitting and receiving a signal having a discrete frequency selected from a predetermined range of frequencies at each of a plurality of points in said area;

storing complex reflectance values having phase and intensity components in a computer memory, each said reflectance value representative of said signal received at one of said points;

Fourier transforming said stored complex reflectance values to form a received spectrum;

propagating said received spectrum to a predetermined depth; and inverse Fourier transforming the propagated spectrum to form a calculated image representative of said pattern of leakage of said fluid; and simultaneously displaying all said calculated images and a predetermined image representative of a pattern of said fluid in said structure, thereby illustrating the progression of leakage during said predetermined period.

12. The method for producing an image described in claim 11, wherein each said calculated image and said predetermined image are plan views.

* * * * *